(12) United States Patent  
Satat

(10) Patent No.: US 12,456,216 B2  
(45) Date of Patent: Oct. 28, 2025

(54) DEPTH FROM VISION WITH PARTIAL STEREO OVERLAP

(71) Applicant: GM Cruise Holdings LLC, San Francisco, CA (US)

(72) Inventor: Guy Satat, Sunnyvale, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 307 days.

(21) Appl. No.: 18/361,089

(22) Filed: Jul. 28, 2023

(65) Prior Publication Data

US 2025/0037291 A1   Jan. 30, 2025

(51) Int. Cl.
*G06T 7/593*     (2017.01)
*G06V 20/58*     (2022.01)
*G06V 20/70*     (2022.01)

(52) U.S. Cl.
CPC ............. *G06T 7/593* (2017.01); *G06V 20/58* (2022.01); *G06V 20/70* (2022.01); *G06T 2207/10012* (2013.01); *G06T 2207/20081* (2013.01); *G06T 2207/20084* (2013.01); *G06T 2207/30261* (2013.01)

(58) Field of Classification Search
CPC ........... G06T 7/593; G06T 2207/10012; G06T 2207/20081; G06T 2207/20084; G06T 2207/30261; G06T 2207/30252; G06V 20/58; G06V 20/70
See application file for complete search history.

(56) References Cited

U.S. PATENT DOCUMENTS

2022/0020168 A1*   1/2022   Price .................. G06F 3/012

\* cited by examiner

*Primary Examiner* — Christopher Wait
(74) *Attorney, Agent, or Firm* — CANTOR COLBURN LLP

(57) ABSTRACT

The present disclosure generally relates to determining depth information for an image frame and, more specifically, to using partially overlapping image portions to propagate depth information through the entire image frame. In some aspects, a method of the disclosed technology includes steps for identifying an overlapping portion of a first image frame and a second image frame, and a non-overlapping portion of the first image frame; determining depth information for one or more pixels in the overlapping portion of the first image frame, wherein a stereo overlap technique is used to determine the depth information; determining semantic information for the non-overlapping portion of the first image frame; and providing the depth information and the semantic information to a machine learning model to get depth information for the non-overlapping portion of first image frame. Systems and machine-readable media are also provided.

20 Claims, 6 Drawing Sheets

DEPTH FROM VISION WITH PARTIAL STEREO OVERLAP

BACKGROUND

1. Technical Field

The present disclosure generally relates to determining depth information for an image frame and, more specifically, to using partially overlapping image portions to propagate depth information through the entire image frame.

2. Introduction

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1A:
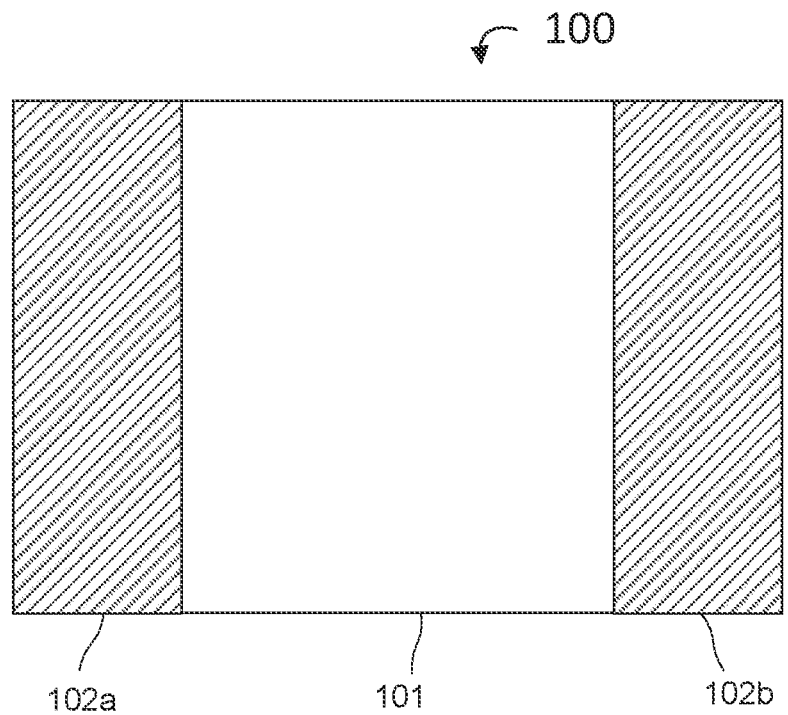
FIG. 1A illustrates an example image frame, according to some examples of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form to avoid obscuring the concepts of the subject technology.

Some aspect of the present technology may relate to the gathering and use of data available from various sources to improve safety, quality, and experience. The present disclosure contemplates that in some instances, this gathered data may include personal information. The present disclosure contemplates that the entities involved with such personal information respect and value privacy policies and practices.

Autonomous vehicles (AVs) can navigate roadways without a human driver based on sensor signals generated by multiple sensor systems, as discussed in more detail below. One type of sensor that can be used by AVs to help navigate roadways is a camera sensor. One or more camera sensors can be mounted about the AV, and image frames generated by the one or more cameras can be processed by the AV's computing system to enable the AV to "see" its environment and subsequently make decisions on how to proceed. For example, a perception stack can detect and classify objects detected by the one or more camera sensors and determine their current locations, speeds, directions, and the like.

Camera sensors can also be used to determine depth information related to objects detected within image frames captured by the camera sensor. For example, each pixel of an image frame captured by a camera sensor can have a depth value associated with it indicating the distance that the object associated with that pixel is located from the camera sensor. In some cases, depth information can be determined from image frames captured by the camera sensor by using stereo overlap techniques, or monocular depth techniques. However, both of these techniques have limitations and may not always provide reliable depth information for the AV. Stereo techniques can determine depth information for pixels within an image frame by using two cameras with overlapping fields of view. The overlapping fields of view can produce two image frames with overlapping views of the same portion of the environment. Within the overlapping portions, it can then be determined which pixels in the first image correspond to which pixels in the second image. In some examples, geometrical reasoning can be used to determine the location of each pixel that corresponds to a pixel between the two image frames. That is, the distance between the two pixels can be determined based on the location of the camera, and subsequently the location of the pixels in 3D space can be determined by triangulation.

Monocular depth techniques can infer depth information for pixels within a single captured image frame by using semantic information. While monocular depth techniques do not require two images to infer the depth information, the depth information can be less reliable than the depth information determined using stereo techniques. In some examples, the distance of an object from the camera can be inferred by comparing a known size of an object to the number of pixels that object occupies within the camera frame. For example, if the image frame includes a car, the distance that the car is located from the camera can be inferred by comparing the known size of a car with the number of pixels the car occupies in the image frame.

Therefore, using a monocular depth technique to infer depth information can include first understanding what type of object appears in an image frame in order to subsequently do the comparison. In some examples, relationships between various objects within an image frame can also be used to infer depth information about those objects. For example, if the image frame includes two cars, with the first car occupying many more pixels than the second car, it can be inferred that the first car is closer to the camera (and therefore the AV), than the second car. In some examples, understanding where an object within an image frame is with respect to the road plane can also be used to infer depth information about those objects. For example, the computing system of the AV can determine where the object is located with respect to the road plane and subsequently infer the distance that the object is located from the camera (and therefore the AV).

However, both stereo techniques and monocular depth techniques can have drawbacks and/or may not always provide reliable depth information for the AV. Stereo techniques can require the field of view of two camera sensors to cover the entire environment around the AV at all times. This can become cost prohibitive due to, for example, the cost of camera sensors, and therefore it may not always be practical to outfit each AV with enough camera sensors so that field of view overlap exists for the entire environment surrounding the AV. Additionally, stereo techniques can use large amounts of computing resources to process the image frames and determine the pixel depths, which can increase costs and processing times. Further, an additional limitation of stereo techniques is the sensitivity to calibration accuracy. There are also drawbacks to using monocular depth techniques to infer depth information. Monocular depth techniques using semantic based depth estimation relies more on inferences and less on geometric certainty when compared to stereo, and as a result the depth information can be less reliable. For example, it can be difficult to determine the global metric scale of an image frame using monocular depth techniques. The global metric scale can be defined as a type of anchor that defines the distances between the camera sensor and the objects represented by the pixels in the image frame. While stereo techniques can inherently provide a global metric scale in units of disparity for any image frame, converting the units of disparity to metric scale can require accurate calibration. While stereo techniques can inherently provide a global metric scale in units of disparity for any image frame, monocular depth techniques may not always provide a reliable global metric scale. Monocular depth techniques can accurately determine which object in an image frame is closer to the camera sensor, but may not always accurately determine the objective distance that a given object is located from the camera sensor. In some examples, monocular depth techniques can be reliable in understanding local relationships between objects (for example, the curvature of an object), but can sometimes not be reliable in understanding global relationships (for example, the distance between two objects in the image frame). In some cases, the farther apart two objects are located from each other within an image frame, the harder it can become to determine the distance between them using monocular depth techniques. Therefore, while monocular depth techniques can be sufficient at understanding relative distances between objects within an image frame, it can be unreliable at understanding the actual distances that those objects are located from the camera sensor and from each other (e.g., the object's locations in 3D space). There is therefore a need to determine more accurate depth information for each pixel within image frames captured by camera sensors of an AV than monocular depth techniques are capable of determining, without the costly need to mount a sufficient number of camera sensors about the AV to provide overlapping coverage of the entire environment around the AV.

Described herein are systems, apparatuses, processes (also referred to as methods), and computer-readable media (collectively referred to as "systems and techniques") for determining depth information for pixels of an image frame captured by a camera sensor of an AV by leveraging the partial camera sensor field of view overlap to determine depth cues for the overlapping portion of the image frames and propagating those depth cues to the non-overlapping portion of the image frames. In many cases, while AVs may not be mounted with stereo pairs of camera sensors, the camera sensors can nonetheless be positioned in such a way that an overlap exists at the edge of the field of view of each camera sensor with the field of view of the camera sensor that is mounted closest. A slight overlap between the field of views of each camera sensor mounted on the AV can be important to ensure that no portion of the environment is not covered, thereby avoiding blind spots in the AV environment. This slight overlap between the field of views of each camera sensor mounted on the AV can also produce image frames with partially overlapping portions on one or both sides of the image frame that can be used to determine depth information of the pixels located in the partially overlapping portions of the image frames using stereo techniques discussed above. The determined depth information for the pixels located in the partially overlapping portions of the image frames can be used to create a global metric scale for the entire image frame, thereby determining depth information of every pixel in the image frame.

FIG. 1A illustrates an example image frame 100, such as, for example an image frame captured by a first camera sensor of an AV. In some examples, AVs can be mounted with multiple camera sensors, wherein these camera sensors can be positioned on the AV in such a manner that the field of view of each camera sensor partially overlaps the field of the view of the adjacent camera sensors. This can ensure that the entire environment around the AV is captured by the camera sensors (e.g., no blind spots). In some examples, this partial overlap can also be useful for various handoff and tracking scenarios. As shown in FIG. 1A, image frame 100 includes edge portion 102a and edge portion 102b. Edge portion 102a represents the portion of image frame 100 that overlaps with an image frame captured by a second camera sensor on one side of the first camera sensor. Further, edge portion 102b represents the portion of image frame 100 that overlaps with an image frame captured by a third camera sensor on the other side of the first camera sensor. The middle portion 101 of image frame 100 represents the portion of image frame 100 that has no overlap with any image frame captured by any other camera sensor.

Therefore, the depth information for the pixels located within edge portion 102a and edge portion 102b can be determined by using stereo overlap techniques. This can determine precise and accurate depth information for all pixels within edge portion 102a and edge portion 102b based on triangulating the known locations of the cameras with the distance between the pixels in the image frames. In some examples, the depth information determined for the pixels within edge portion 102a and edge portion 102b can be used to determine a global metric scale of the entire image frame 100. Because middle portion 101 of image frame 100 has no corresponding overlapping image frame captured from another camera sensor, it may not be possible to use stereo techniques to determine the pixel depths of the pixels located within middle portion 101. Rather, in some examples, middle portion 101 can comprise color data (e.g., examples include, but are not limited to, RGB (red, green, blue), monochrome, infrared, RCCC (red, clear, clear, clear), RCCB (red, clear, clear, blue), etc.). In some scenarios, additional semantic data can also be associated with the pixels located in middle portion 101, but accurate depth information can be difficult to determine. In some examples, semantic data can include a bounding area around a perceived object that can be associated with a semantic label that identifies the type of object that is within the bounding area, the kinematic of the object (information about its movement), a tracked path of the object, and a description of the pose of the object (its orientation or heading, etc.).

Figure 1B:
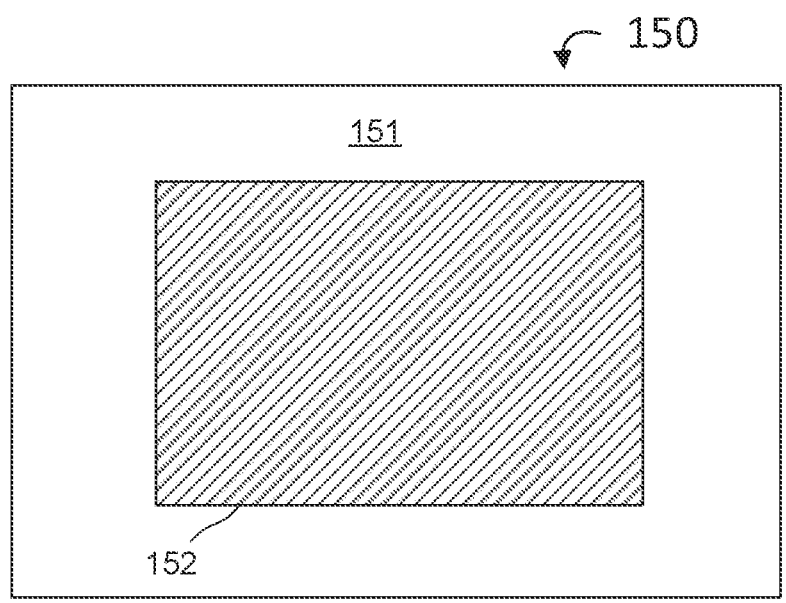
FIG. 1B illustrates another example image frame, according to some examples of the present disclosure.

Similar to FIG. 1A, FIG. 1B also illustrates an example image frame 150 comprising a partially overlapping image frame portion 152. In the scenario depicted in FIG. 1B, rather than the camera sensors being located adjacent one another to produce the partially overlapping image portions, two camera sensors comprising different lenses (or different fields of view, for example) can capture portions of the same part of the environment. For example, a first camera sensor can comprise a wide-angle lens while a second camera can comprise a telephoto lens. In some scenarios, the overlapping portion can be a result of either overlapping fields of view, different camera lenses, or both. As shown in FIG. 1B, middle portion 152 represents the portion of image frame 150 captured by a first camera with a first type of lens that overlaps with a second image frame captured by a second camera sensor with a second type of lens (e.g., different type of lens than the first camera). Therefore, the depth information for the pixels located within middle portion 152 can be determined by using stereo overlap techniques. Additionally, the depth information determined for the pixels within middle portion 152 can be used to determine a global metric scale of the entire image frame 150. Similar to middle portion 101 of image frame 100 in FIG. 1A, outer portion 151 of image frame 150 has no corresponding overlapping image frame captured from another camera sensor, and therefore it may not be possible to use stereo techniques to determine the pixel depths of the pixels located within outer portion 151 of image frame 150. Rather, in some examples, outer portion 151 can comprise only color data (as described above). In some scenarios, additional semantic data can also be associated with the pixels located in outer portion 151, but accurate depth information can be difficult to determine.

One process that can determine accurate depth information for all of the pixels in an image frame comprising a partially overlapping portion is to combine the semantic information from the non-overlapping portions of the image frame (e.g., middle portion 101 in FIG. 1A and outer portion 151 in FIG. 1B) with the depth and semantic information from the overlapping portions of the image frame (e.g., edge portion 102a and edge portion 102b in FIG. 1A, and middle portion 152 in FIG. 1B). For example, a depth map can be determined for the non-overlapping portions of the image frames using monocular depth techniques, and a depth map can be determined for the overlapping portions of the image frames using stereo overlap techniques. These depth maps can be multiplied together to get a global scale for the image frame that can indicate the depth of each pixel in the image frame. In some scenarios, this process can produce valid results, and in other scenarios this process can produce inaccurate results. Therefore, another process is also contemplated to determine accurate depth information for all of the pixels in an image frame comprising a partially overlapping portion, as discussed below with reference to FIG. 2.

While FIG. 1A and FIG. 1B illustrate exemplary scenarios of partially overlapping image frame portions, it is understood that the processes described herein are equally applicable to any scenario wherein a portion of a first image frame overlaps with a portion of a second image frame. For example, the partial overlap can occur on the top and/or bottom of the image frame. In other examples, the overlapping portion can be present on only one side (e.g., top, bottom, left, or right) of the image frame.

Figure 2:
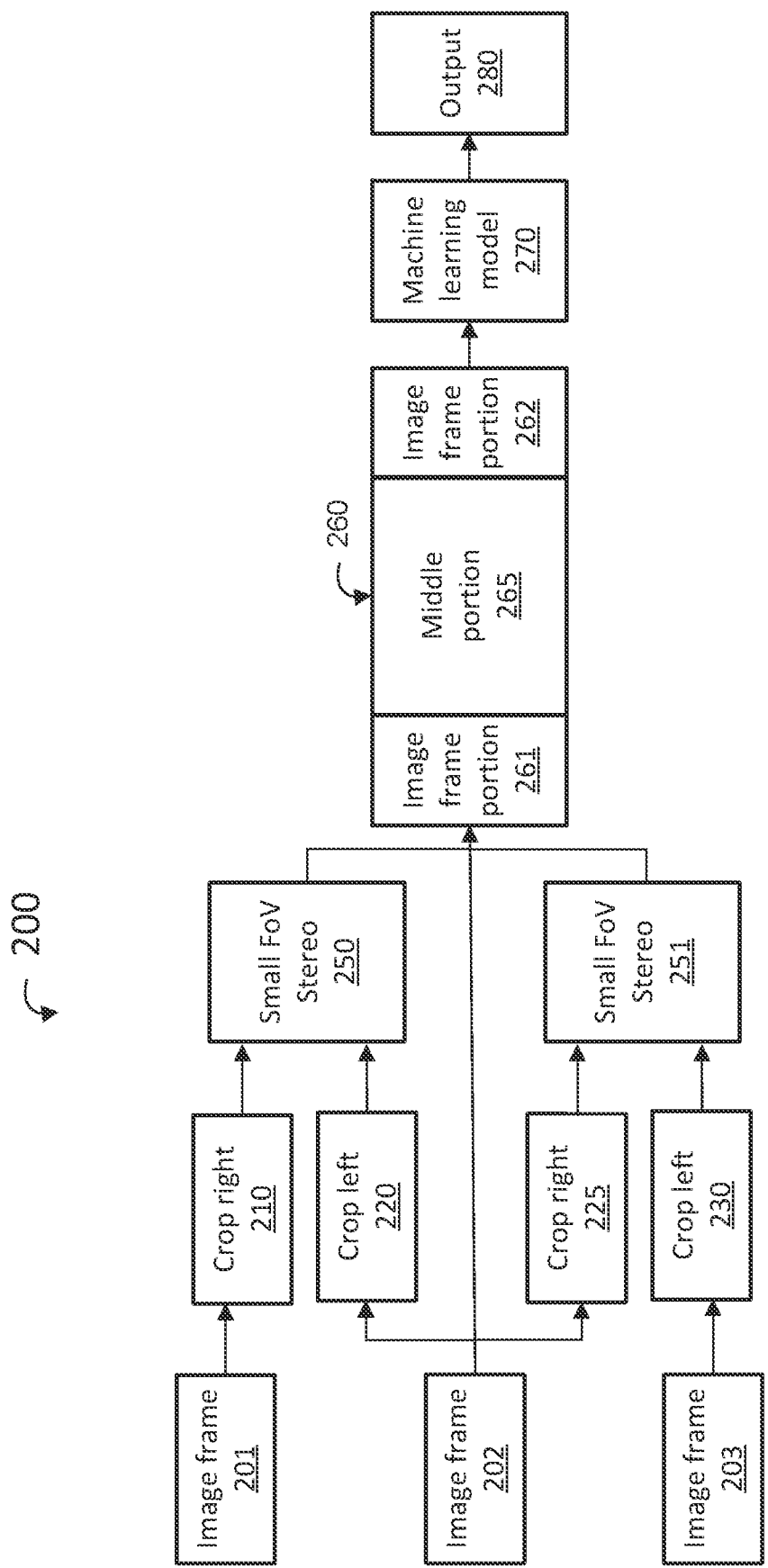
FIG. 2 illustrates a process for determining a depth map for an image frame, according to some examples of the present disclosure.

FIG. 2 illustrates a process 200 for determining a depth map for an image frame (e.g., image frame 100 or image frame 150), such as, for example, an image frame captured by a camera sensor of an AV. This process can be applicable to AVs due to the nature of AVs typically comprising multiple camera sensors mounted about the body of the AV, with each field of view of each camera sensor partially overlapping the field of view of the adjacent camera sensors. In the example process 200 shown in FIG. 2, three image frames (e.g., image frame 201, image frame 202, and image frame 203) have been captured by three different camera sensors mounted about the body of the AV. For example, image frame 201 can be captured from a first camera sensor, image frame 202 can be captured from a second camera sensor, and image frame 203 can be captured from a third camera sensor. In this example, all three cameras can be mounted on the body of the AV, and the first camera can be adjacent to the second camera, which can be adjacent to the third camera so that the field of view of the first camera and the field of view of the third camera partially overlap with the field of view of the second camera.

As shown in FIG. 2, the portion of image frame 201 that overlaps with a portion of image 202 can be represented as crop right 210, while the portion of image frame 202 that overlaps with a portion of image 201 can be represented as crop left 220. At block 250, stereo overlap techniques can be used to combine crop right 210 and crop left 220 to determine depth values for those pixels within crop right 210 and crop left 220. Similarly, the portion of image frame 202 that overlaps with a portion of image 203 can be represented as crop right 225, while the portion of image frame 203 that overlaps with a portion of image 202 can be represented as crop left 230. At block 251, stereo overlap techniques can also be used to combine crop right 225 and crop left 230 to determine depth values for those pixels within crop right 225 and crop left 230.

At block 260, the RGB data of image frame 202 can be combined with the depth values determined at block 250 and block 251. For example, image frame portion 261 can comprise the RGB image data of image frame 202 combined with the depth values for those pixels within crop right 210 and crop left 220 that was determined using stereo overlap techniques. Additionally, image frame portion 262 can comprise the RGB image data of image frame 202 combined with the depth values for those pixels within crop right 225 and crop left 230 that was determined using stereo overlap techniques. In some examples, middle portion 265 of image frame 202 can comprise the RGB data without any depth information. In some examples, middle portion 265 of image frame 202 can comprise the RGB data and depth information obtained using the less reliable monocular depth techniques discussed above.

At block 270, the image frame data resulting from block 260 can be input into a machine learning model to produce a depth map for the entire image frame 202 at a desired resolution based on the partial overlapping stereo depth and the RGB data. In some examples, the machine learning model can be trained using a supervised technique. For example, ground-truth depth data can be obtained from simulations and/or real-world data collections that can be used to supervise the machine learning model. In some examples, ground-truth depth data can be obtained from image frames comprising pre-labeled distance information for the pixels. Ground-truth information can be used to train a machine learning model to predict depth information. In other examples, the machine learning model can be trained using an unsupervised technique by leveraging temporal information obtained from camera sensors. Temporal information can include information related to the motion of the AV. For example, as the AV moves through the environment, the image frames captured using the camera sensors can include an object in the AV's environment. As the AV moves and/or the object in the AV's environment moves, the location of the object within the image frames captured by the camera sensors will also move. Because the locations of the camera sensors are known at any time, the machine learning model can reason about the depth of the object's location to create a depth map that can be used to supervise one of the image frames. In some examples, the machine learning model can be any monocular depth machine learning model. For example, the model can be a feature extractor (such as, for example, a ResNet or transformer backbone) followed subsequently by a depth regression head that can aggregate features from the various feature extractor levels to create a depth map. The output of the machine learning model, as shown in block 280, can be a depth map for the entire image frame.

While the process 200 illustrated in FIG. 2 shows three image frames (e.g., image frame 201, image frame 202, and image frame 203) captured by three camera sensors mounted about the AV, the process is applicable to any number of image frames captured by any number of camera sensors. Additionally, the process 200 can be repeated as many times as necessary to obtain accurate depth information for objects detected by camera sensors. Further, the process 200 is also applicable to any situation where two camera image frames at least partially overlap one another, regardless of whether the cameras are mounted on an AV.

Figure 3:
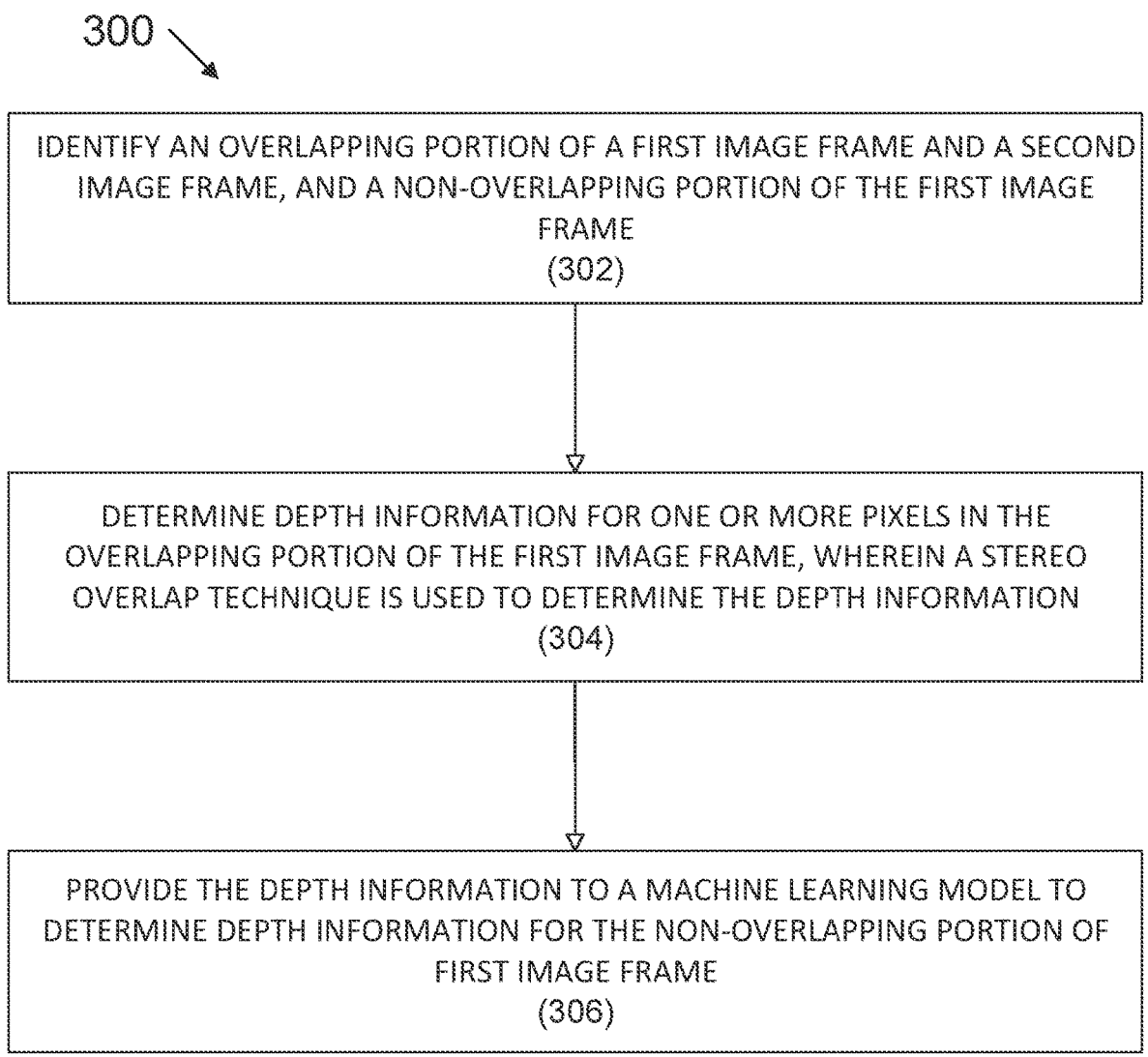
FIG. 3 illustrates a process for determining depth information for an image frame, according to some examples of the present disclosure.

FIG. 3 illustrates a process 300 for determining depth information for an image frame (e.g., image frame 100). At block 302, the process 300 can include identifying an overlapping portion of a first image frame and a second image frame, and a non-overlapping portion of the first image frame. As discussed above, AVs can be mounted with multiple camera sensors, wherein these camera sensors can be positioned on the AV in such a manner that the field of view of each camera sensor partially overlaps the field of the view of the adjacent camera sensors. This can ensure that the entire environment around the AV is captured by the camera sensor, thereby preventing blind spots. In some examples, this partial overlap can also be useful for various handoff and tracking scenarios. As shown with reference to FIG. 1A, image frame 100 includes edge portion 102a and edge portion 102b. Edge portion 102a represents the portion of image frame 100 that overlaps with an image frame captured by a second camera sensor on one side of the first camera sensor. Further, edge portion 102b represents the portion of image frame 100 that overlaps with an image frame captured by a third camera sensor on the other side of the first camera sensor. Additionally, with reference to FIG. 2, the portion of image frame 201 that overlaps with a portion of image 202 can be represented as crop right 210, while the portion of image frame 202 that overlaps with a portion of image 201 can be represented as crop left 220.

At block 304, the process 300 can include determining depth information for one or more pixels in the overlapping portion of the first image frame, wherein a stereo overlap technique is used to determine the depth information. As discussed above, stereo techniques can determine depth information for pixels within an image frame by using two cameras with overlapping fields of view. The overlapping fields of view can produce two image frames with overlapping views of the same portion of the environment. Within the overlapping portions, it can then be determined which pixels in the first image correspond to which pixels in the second image. In some examples, geometrical reasoning can be used to determine the location of each pixel that corresponds to a pixel between the two image frames. That is, the distance between the two pixels can be determined based on the location of the camera, and subsequently the location of the pixels in 3D space can be determined by triangulation. Therefore, with reference to FIG. 1A, the depth information for the pixels located within edge portion 102a and edge portion 102b can be determined by using stereo overlap techniques. This can determine precise and accurate depth information for all pixels within edge portion 102a and edge portion 102b based on triangulating the known locations of the cameras with the distance between the pixels in the image frames. In some examples, the depth information determined for the pixels within edge portion 102a and edge portion 102b can be used to determine a global metric scale of the entire image frame 100.

Further, with reference to FIG. 2, stereo overlap techniques can be used to combine crop right 210 and crop left 220 to determine depth values for those pixels within crop right 210 and crop left 220 (at block 250 of FIG. 2). Similarly, the portion of image frame 202 that overlaps with a portion of image 203 can be represented as crop right 225, while the portion of image frame 203 that overlaps with a portion of image 202 can be represented as crop left 230. Stereo overlap techniques can also be used to combine crop right 225 and crop left 230 to determine depth values for those pixels within crop right 225 and crop left 230 (at block 251 of FIG. 2).

At block 306, the process 300 can include providing the depth information to a machine learning model to get depth information for the non-overlapping portion of first image frame. Specifically, the image frame data can be input into a machine learning model to produce a depth map for the entire image frame at a desired resolution based on the partial overlapping stereo depth and the RGB data. In some examples, the machine learning model can be trained using a supervised technique. For example, ground-truth depth data can be obtained from simulations and/or real-world data collections that can be used to supervise the machine learning model. In other examples, the machine learning model can be trained using an unsupervised technique by leveraging temporal information obtained from camera sensors. Temporal information can include information related to the motion of the AV. For example, as the AV moves through the environment, the image frames captured using the camera sensors can include an object in the AV's environment. As the AV moves and/or the object in the AV's environment moves, the location of the object within the image frames captured by the camera sensors will also move. Because the locations of the camera sensors are known at any time, the machine learning model can reason about the depth of the object's location to create a depth map that can be used to supervise one of the image frames. The output of the machine learning model, can be a depth map for the entire first image frame.

Figure 4:
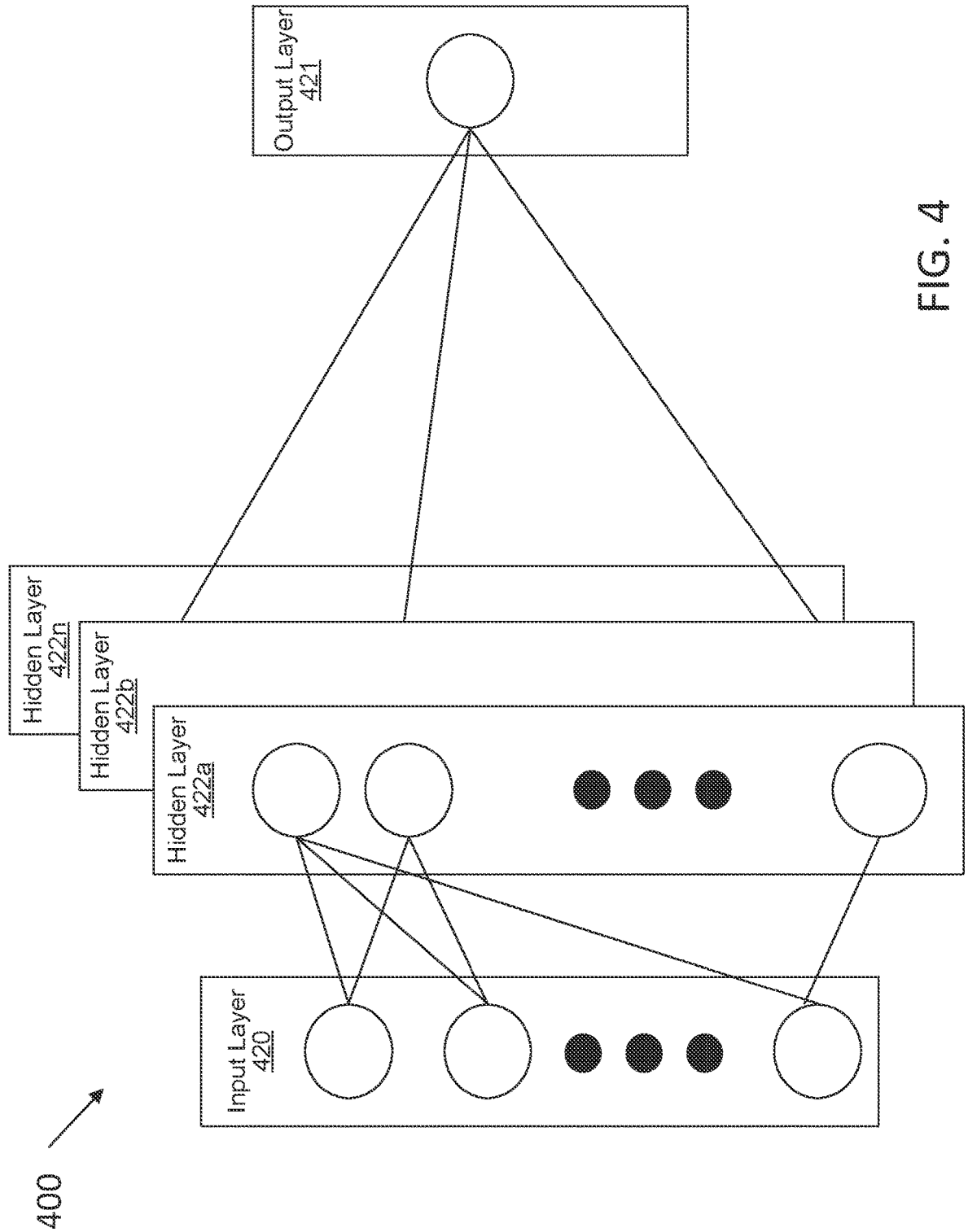
FIG. 4 illustrates an example of a deep learning neural network that can be used to implement a model for producing a depth map for the entire image frame at a desired resolution based on partially overlapping image data, according to some aspects of the disclosed technology.

In FIG. 4, the disclosure now turns to a further discussion of models that can be used through the environments and techniques described herein. FIG. 4 is an example of a deep learning neural network 400 that can be used to implement all or a portion of the systems and techniques described herein (e.g., neural network 400 can be used to implement a model to produce a depth map for the entire image frame at a desired resolution based on partially overlapping image data, as discussed above). An input layer 420 can be configured to receive sensor data and/or data relating to an environment surrounding an AV. Neural network 400 includes multiple hidden layers 422a, 422b, through 422n. The hidden layers 422a, 422b, through 422n include "n" number of hidden layers, where "n" is an integer greater than or equal to one. The number of hidden layers can be made to include as many layers as needed for the given application. Neural network 400 further includes an output layer 421 that provides an output resulting from the processing performed by the hidden layers 422a, 422b, through 422n.

Neural network 400 is a multi-layer neural network of interconnected nodes. Each node can represent a piece of information. Information associated with the nodes is shared among the different layers and each layer retains information as information is processed. In some cases, the neural network 400 can include a feed-forward network, in which case there are no feedback connections where outputs of the network are fed back into itself. In some cases, the neural network 400 can include a recurrent neural network, which can have loops that allow information to be carried across nodes while reading in input.

Information can be exchanged between nodes through node-to-node interconnections between the various layers. Nodes of the input layer 420 can activate a set of nodes in the first hidden layer 422a. For example, as shown, each of the input nodes of the input layer 420 is connected to each of the nodes of the first hidden layer 422a. The nodes of the first hidden layer 422a can transform the information of each input node by applying activation functions to the input node information. The information derived from the transformation can then be passed to and can activate the nodes of the next hidden layer 422b, which can perform their own designated functions. Example functions include convolutional, up-sampling, data transformation, and/or any other suitable functions. The output of the hidden layer 422b can then activate nodes of the next hidden layer, and so on. The output of the last hidden layer 422n can activate one or more nodes of the output layer 421, at which an output is provided. In some cases, while nodes in the neural network 400 are shown as having multiple output lines, a node can have a single output and all lines shown as being output from a node represent the same output value.

In some cases, each node or interconnection between nodes can have a weight that is a set of parameters derived from the training of the neural network 400. Once the neural network 400 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 400 to be adaptive to inputs and able to learn as more and more data is processed.

The neural network 400 is pre-trained to process the features from the data in the input layer 420 using the different hidden layers 422a, 422b, through 422n in order to provide the output through the output layer 421.

In some cases, the neural network 400 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network 400 is trained well enough so that the weights of the layers are accurately tuned. To perform training, a loss function can be used to analyze error in the output. Any suitable loss function definition can be used, such as a Cross-Entropy loss. Another example of a loss function includes the mean squared error (MSE), defined as $E\_total => \Sigma(½(target-output)^2)$. The loss can be set to be equal to the value of E_total. The loss (or error) will be high for the initial training data since the actual values will be much different than the predicted output. The goal of training is to minimize the amount of loss so that the predicted output is the same as the training output. The neural network 400 can perform a backward pass by determining which inputs (weights) most contributed to the loss of the network, and can adjust the weights so that the loss decreases and is eventually minimized.

The neural network 400 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for downsampling), and fully connected layers. The neural network 400 can include any other deep network other than a CNN, such as an autoencoder, Deep Belief Nets (DBNs), Recurrent Neural Networks (RNNs), among others.

As understood by those of skill in the art, machine-learning based classification techniques can vary depending on the desired implementation. For example, machine-learning classification schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Min-wise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Figure 5:
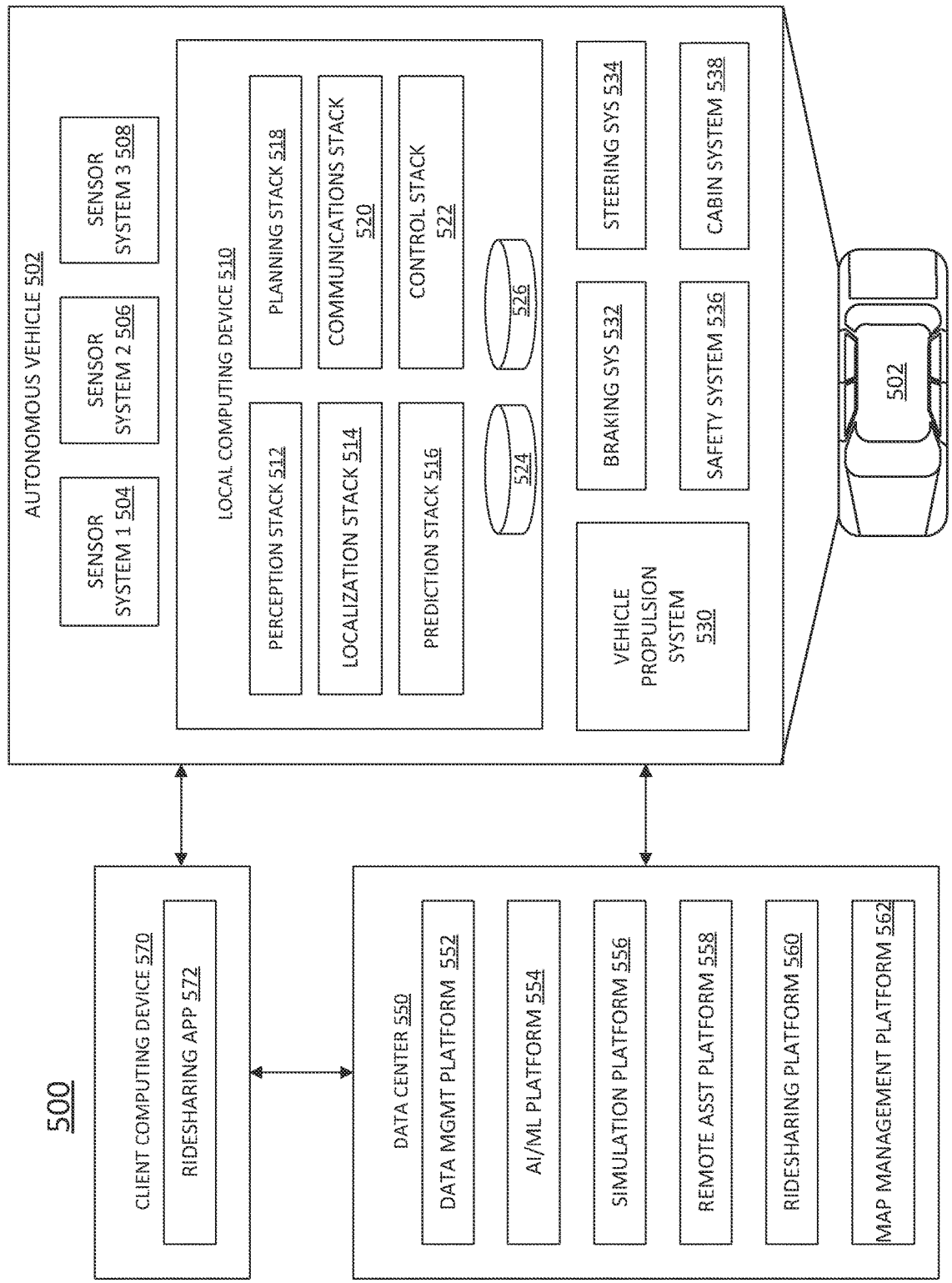
FIG. 5 illustrates an example system environment that can be used to facilitate autonomous vehicle (AV) dispatch and operations, according to some aspects of the disclosed technology.

FIG. 5 is a diagram illustrating an example autonomous vehicle (AV) environment 500, according to some examples of the present disclosure. One of ordinary skill in the art will understand that, for AV environment 500 and any system discussed in the present disclosure, there can be additional or fewer components in similar or alternative configurations.

The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV environment 500 includes an AV 502, a data center 550, and a client computing device 570. The AV 502, the data center 550, and the client computing device 570 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 502 can navigate roadways without a human driver based on sensor signals generated by multiple sensor systems 504, 506, and 508. The sensor systems 504-508 can include one or more types of sensors and can be arranged about the AV 502. For instance, the sensor systems 504-508 can include Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 504 can be a camera system, the sensor system 506 can be a LIDAR system, and the sensor system 508 can be a RADAR system. Other examples may include any other number and type of sensors.

The AV 502 can also include several mechanical systems that can be used to maneuver or operate the AV 502. For instance, the mechanical systems can include a vehicle propulsion system 530, a braking system 532, a steering system 534, a safety system 536, and a cabin system 538, among other systems. The vehicle propulsion system 530 can include an electric motor, an internal combustion engine, or both. The braking system 532 can include an engine brake, brake pads, actuators, and/or any other suitable componentry configured to assist in decelerating the AV 502. The steering system 534 can include suitable componentry configured to control the direction of movement of the AV 502 during navigation. The safety system 536 can include lights and signal indicators, a parking brake, airbags, and so forth. The cabin system 538 can include cabin temperature control systems, in-cabin entertainment systems, and so forth. In some examples, the AV 502 might not include human driver actuators (e.g., steering wheel, handbrake, foot brake pedal, foot accelerator pedal, turn signal lever, window wipers, etc.) for controlling the AV 502. Instead, the cabin system 538 can include one or more client interfaces (e.g., Graphical User Interfaces (GUIs), Voice User Interfaces (VUIs), etc.) for controlling certain aspects of the mechanical systems 530-538.

The AV 502 can include a local computing device 510 that is in communication with the sensor systems 504-508, the mechanical systems 530-538, the data center 550, and the client computing device 570, among other systems. The local computing device 510 can include one or more processors and memory, including instructions that can be executed by the one or more processors. The instructions can make up one or more software stacks or components responsible for controlling the AV 502; communicating with the data center 550, the client computing device 570, and other systems; receiving inputs from riders, passengers, and other entities within the AV's environment; logging metrics collected by the sensor systems 504-508; and so forth. In this example, the local computing device 510 includes a perception stack 512, a localization stack 514, a prediction stack 516, a planning stack 518, a communications stack 520, a control stack 522, an AV operational database 524, and an HD geospatial database 526, among other stacks and systems.

Perception stack 512 can enable the AV 502 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 504-508, the localization stack 514, the HD geospatial database 526, other components of the AV, and other data sources (e.g., the data center 550, the client computing device 570, third party data sources, etc.). The perception stack 512 can detect and classify objects and determine their current locations, speeds, directions, and the like. In addition, the perception stack 512 can determine the free space around the AV 502 (e.g., to maintain a safe distance from other objects, change lanes, park the AV, etc.). The perception stack 512 can identify environmental uncertainties, such as where to look for moving objects, flag areas that may be obscured or blocked from view, and so forth. In some examples, an output of the perception stack 512 can be a bounding area around a perceived object that can be associated with a semantic label that identifies the type of object that is within the bounding area, the kinematic of the object (information about its movement), a tracked path of the object, and a description of the pose of the object (its orientation or heading, etc.).

Localization stack 514 can determine the AV's position and orientation (pose) using different methods from multiple systems (e.g., GPS, IMUs, cameras, LIDAR, RADAR, ultrasonic sensors, the HD geospatial database 526, etc.). For example, in some cases, the AV 502 can compare sensor data captured in real-time by the sensor systems 504-508 to data in the HD geospatial database 526 to determine its precise (e.g., accurate to the order of a few centimeters or less) position and orientation. The AV 502 can focus its search based on sensor data from one or more first sensor systems (e.g., GPS) by matching sensor data from one or more second sensor systems (e.g., LIDAR). If the mapping and localization information from one system is unavailable, the AV 502 can use mapping and localization information from a redundant system and/or from remote data sources.

Prediction stack 516 can receive information from the localization stack 514 and objects identified by the perception stack 512 and predict a future path for the objects. In some examples, the prediction stack 516 can output several likely paths that an object is predicted to take along with a probability associated with each path. For each predicted path, the prediction stack 516 can also output a range of points along the path corresponding to a predicted location of the object along the path at future time intervals along with an expected error value for each of the points that indicates a probabilistic deviation from that point.

Planning stack 518 can determine how to maneuver or operate the AV 502 safely and efficiently in its environment. For example, the planning stack 518 can receive the location, speed, and direction of the AV 502, geospatial data, data regarding objects sharing the road with the AV 502 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 502 from one point to another and outputs from the perception stack 512, localization stack 514, and prediction stack 516. The planning stack 518 can determine multiple sets of one or more mechanical operations that the AV 502 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 518 can select from multiple backup plans to carry out. For example, while preparing to change lanes to turn right at an intersection, another vehicle may aggressively cut into the destination lane, making the lane change unsafe. The planning stack 518 could have already determined an alternative plan for such an event. Upon its occurrence, it could help direct the AV 502 to go around the block instead of blocking a current lane while waiting for an opening to change lanes.

Control stack 522 can manage the operation of the vehicle propulsion system 530, the braking system 532, the steering system 534, the safety system 536, and the cabin system 538. The control stack 522 can receive sensor signals from the sensor systems 504-508 as well as communicate with other stacks or components of the local computing device 510 or a remote system (e.g., the data center 550) to effectuate operation of the AV 502. For example, the control stack 522 can implement the final path or actions from the multiple paths or actions provided by the planning stack 518. This can involve turning the routes and decisions from the planning stack 518 into commands for the actuators that control the AV's steering, throttle, brake, and drive unit.

Communications stack 520 can transmit and receive signals between the various stacks and other components of the AV 502 and between the AV 502, the data center 550, the client computing device 570, and other remote systems. The communications stack 520 can enable the local computing device 510 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). Communications stack 520 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Low Power Wide Area Network (LPWAN), Bluetooth®, infrared, etc.).

The HD geospatial database 526 can store HD maps and related data of the streets upon which the AV 502 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

AV operational database 524 can store raw AV data generated by the sensor systems 504-508, stacks 512-522, and other components of the AV 502 and/or data received by the AV 502 from remote systems (e.g., the data center 550, the client computing device 570, etc.). In some examples, the raw AV data can include HD LIDAR point cloud data, image data, RADAR data, GPS data, and other sensor data that the data center 550 can use for creating or updating AV geospatial data or for creating simulations of situations encountered by AV 502 for future testing or training of various machine learning algorithms that are incorporated in the local computing device 510.

Data center 550 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 550 can include one or more computing devices remote to the local computing device 510 for managing a fleet of AVs and AV-related services. For example, in addition to managing the AV 502, the data center 550 may also support a ride-hailing service (e.g., a ridesharing service), a delivery service, a remote/roadside assistance service, street services (e.g., street mapping, street patrol, street cleaning, street metering, parking reservation, etc.), and the like.

Data center 550 can send and receive various signals to and from the AV 502 and the client computing device 570. These signals can include sensor data captured by the sensor systems 504-508, roadside assistance requests, software updates, ride-hailing/ridesharing pick-up and drop-off instructions, and so forth. In this example, the data center 550 includes a data management platform 552, an Artificial Intelligence/Machine Learning (AI/ML) platform 554, a simulation platform 556, a remote assistance platform 558, and a ride-hailing platform 560, and a map management platform 562, among other systems.

Data management platform 552 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ride-hailing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 550 can access data stored by the data management platform 552 to provide their respective services.

The AI/ML platform 554 can provide the infrastructure for training and evaluating machine learning algorithms for operating the AV 502, the simulation platform 556, the remote assistance platform 558, the ride-hailing platform 560, the map management platform 562, and other platforms and systems. Using the AI/ML platform 554, data scientists can prepare data sets from the data management platform 552; select, design, and train machine learning models; evaluate, refine, and deploy the models; maintain, monitor, and retrain the models; and so on.

Simulation platform 556 can enable testing and validation of the algorithms, machine learning models, neural networks, and other development efforts for the AV 502, the remote assistance platform 558, the ride-hailing platform 560, the map management platform 562, and other platforms and systems. Simulation platform 556 can replicate a variety of driving environments and/or reproduce real-world scenarios from data captured by the AV 502, including rendering geospatial information and road infrastructure (e.g., streets, lanes, crosswalks, traffic lights, stop signs, etc.) obtained from a cartography platform (e.g., map management platform 562); modeling the behavior of other vehicles, bicycles, pedestrians, and other dynamic elements; simulating inclement weather conditions, different traffic scenarios; and so on.

Remote assistance platform 558 can generate and transmit instructions regarding the operation of the AV 502. For example, in response to an output of the AI/ML platform 554 or other system of the data center 550, the remote assistance platform 558 can prepare instructions for one or more stacks or other components of the AV 502.

Ride-hailing platform 560 can interact with a customer of a ride-hailing service via a ride-hailing application 572 executing on the client computing device 570. The client computing device 570 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ride-hailing application 572. The client computing device 570 can be a customer's mobile computing device or a computing device integrated with the AV 502 (e.g., the local computing device 510). The ride-hailing platform 560 can receive requests to pick up or drop off from the ride-hailing application 572 and dispatch the AV 502 for the trip.

Map management platform 562 can provide a set of tools for the manipulation and management of geographic and spatial (geospatial) and related attribute data. The data management platform 552 can receive LIDAR point cloud data, image data (e.g., still image, video, etc.), RADAR data, GPS data, and other sensor data (e.g., raw data) from one or more AVs 502, Unmanned Aerial Vehicles (UAVs), satellites, third-party mapping services, and other sources of geospatially referenced data. The raw data can be processed, and map management platform 562 can render base representations (e.g., tiles (2D), bounding volumes (3D), etc.) of the AV geospatial data to enable users to view, query, label, edit, and otherwise interact with the data. Map management platform 562 can manage workflows and tasks for operating on the AV geospatial data. Map management platform 562 can control access to the AV geospatial data, including granting or limiting access to the AV geospatial data based on user-based, role-based, group-based, task-based, and other attribute-based access control mechanisms. Map management platform 562 can provide version control for the AV geospatial data, such as to track specific changes that (human or machine) map editors have made to the data and to revert changes when necessary. Map management platform 562 can administer release management of the AV geospatial data, including distributing suitable iterations of the data to different users, computing devices, AVs, and other consumers of HD maps. Map management platform 562 can provide analytics regarding the AV geospatial data and related data, such as to generate insights relating to the throughput and quality of mapping tasks.

In some embodiments, the map viewing services of map management platform 562 can be modularized and deployed as part of one or more of the platforms and systems of the data center 550. For example, the AI/ML platform 554 may incorporate the map viewing services for visualizing the effectiveness of various object detection or object classification models, the simulation platform 556 may incorporate the map viewing services for recreating and visualizing certain driving scenarios, the remote assistance platform 558 may incorporate the map viewing services for replaying traffic incidents to facilitate and coordinate aid, the ride-hailing platform 560 may incorporate the map viewing services into the client application 572 to enable passengers to view the AV 502 in transit en route to a pick-up or drop-off location, and so on.

While the autonomous vehicle 502, the local computing device 510, and the autonomous vehicle environment 500 are shown to include certain systems and components, one of ordinary skill will appreciate that the autonomous vehicle 502, the local computing device 510, and/or the autonomous vehicle environment 500 can include more or fewer systems and/or components than those shown in FIG. 5. For example, the autonomous vehicle 502 can include other services than those shown in FIG. 5 and the local computing device 510 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 5. An illustrative example of a computing device and hardware components that can be implemented with the local computing device 510 is described below with respect to FIG. 6.

Figure 6:
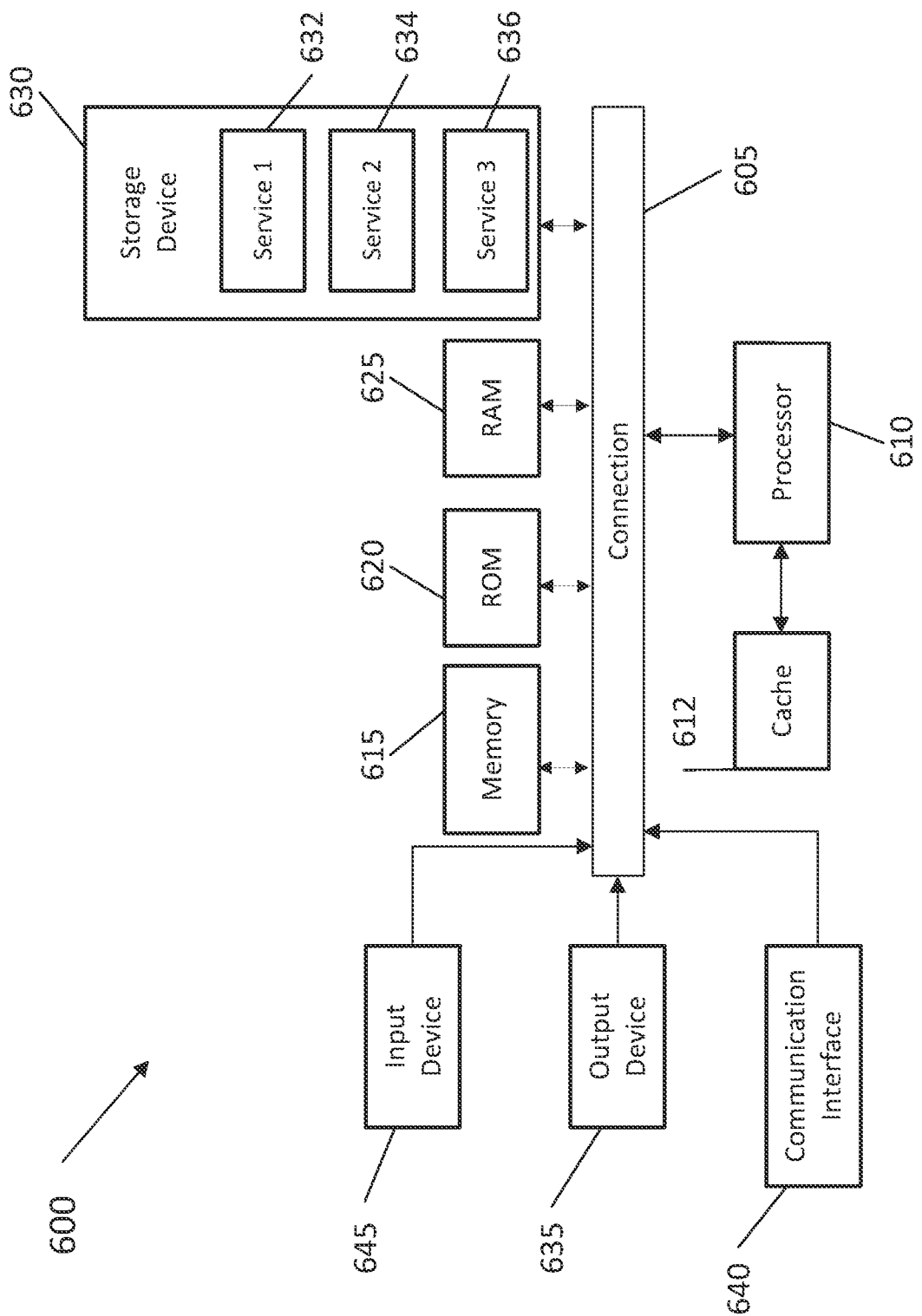
FIG. 6 illustrates an example processor-based system with which some aspects of the subject technology can be implemented.

FIG. 6 illustrates an example processor-based system with which some aspects of the subject technology can be implemented. For example, processor-based system 600 can be any computing device making up, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (Central Processing Unit (CPU) or processor) 610 and connection 605 that couples various system components including system memory 615, such as Read-Only Memory (ROM) 620 and Random-Access Memory (RAM) 625 to processor 610. Computing system 600 can include a cache of high-speed memory 612 connected directly with, in close proximity to, or integrated as part of processor 610.

Processor 610 can include any general-purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 630 can include software services, servers, services, etc., that when the code that defines such software is executed by the processor 610, it causes the system 600 to perform a function. In some embodiments, a hardware service that performs a particular function can include the software component stored in a computer-readable medium in connection with the necessary hardware components, such as processor 610, connection 605, output device 635, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Illustrative examples of the disclosure include:

Aspect 1. A system comprising: at least one memory; and at least one processor coupled to the at least one memory, the at least one processor configured to: identify an overlapping portion of a first image frame and a second image frame, and a non-overlapping portion of the first image frame; determine depth information for one or more pixels in the overlapping portion of the first image frame, wherein a stereo overlap technique is used to determine the depth information; and provide the depth information to a machine learning model to determine depth information for the non-overlapping portion of first image frame.

Aspect 2. The system of Aspect 1, wherein the at least one processor is further configured to: determine semantic information for the non-overlapping portion of the first image frame; and determine depth information based on the semantic information for the portion of the first image frame that does not overlap the second image frame.

Aspect 3. The system of Aspect 1 or 2, wherein the first image frame and the second image frame are collected by one or more camera sensors mounted to an autonomous vehicle.

Aspect 4. The system of any of Aspects 1 to 3, wherein the depth information comprises a depth value for each pixel within the portion of the first image frame that overlaps the second image frame.

Aspect 5. The system of any of Aspects 1 to 4, wherein the depth information for the first image frame includes a global metric scale for the first image frame.

Aspect 6. The system of any of Aspects 1 to 5, wherein the semantic information for the portion of the first image frame that does not overlap the second image frame includes depth information obtained using a monocular depth technique.

Aspect 7. The system of any of Aspects 1 to 6, wherein the first image frame and the second image frame are captured by a camera sensor of an autonomous vehicle.

Aspect 8. A method comprising: identifying an overlapping portion of a first image frame and a second image frame, and a non-overlapping portion of the first image frame; determining depth information for one or more pixels in the overlapping portion of the first image frame, wherein a stereo overlap technique is used to determine the depth information; and providing the depth information to a machine learning model to determine depth information for the non-overlapping portion of first image frame.

Aspect 9. The method of Aspect 8, further comprising: determining semantic information for the non-overlapping portion of the first image frame; and determining depth information based on the semantic information for the portion of the first image frame that does not overlap the second image frame.

Aspect 10. The method of Aspect 8 or 9, wherein the first image frame and the second image frame are collected by one or more camera sensors mounted to an autonomous vehicle.

Aspect 11. The method of any of Aspects 8 to 10, wherein the depth information comprises a depth value for each pixel within the portion of the first image frame that overlaps the second image frame.

Aspect 12. The method of any of Aspects 8 to 11, wherein the depth information for the first image frame includes a global metric scale for the first image frame.

Aspect 13. The method of any of Aspects 8 to 12, wherein the semantic information for the portion of the first image frame that does not overlap the second image frame includes depth information obtained using a monocular depth technique.

Aspect 14. The method of any of Aspects 8 to 13, wherein the first image frame and the second image frame are captured by a camera sensor of an autonomous vehicle.

Aspect 15. A non-transitory computer-readable storage medium comprising at least one instruction for causing a computer or processor to: identify an overlapping portion of a first image frame and a second image frame, and a non-overlapping portion of the first image frame; determine depth information for one or more pixels in the overlapping portion of the first image frame, wherein a stereo overlap technique is used to determine the depth information; and provide the depth information to a machine learning model to determine depth information for the non-overlapping portion of first image frame.

Aspect 16. The non-transitory computer-readable storage medium of Aspect 15, wherein the at least one instruction causes the computer or processor to further: determine semantic information for the non-overlapping portion of the first image frame; and determine depth information based on the semantic information for the portion of the first image frame that does not overlap the second image frame.

Aspect 17. The non-transitory computer-readable storage medium of Aspect 15 or 16, wherein the first image frame and the second image frame are collected by one or more camera sensors mounted to an autonomous vehicle.

Aspect 18. The non-transitory computer-readable storage medium of any of Aspects 15 to 17, wherein the depth information comprises a depth value for each pixel within the portion of the first image frame that overlaps the second image frame.

Aspect 19. The non-transitory computer-readable storage medium of any of Aspects 15 to 18, wherein the depth information for the first image frame includes a global metric scale for the first image frame.

Aspect 20. The non-transitory computer-readable storage medium of any of Aspects 15 to 19, wherein the semantic information for the portion of the first image frame that does not overlap the second image frame includes depth information obtained using a monocular depth technique.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A system comprising:
   at least one memory; and
   at least one processor coupled to the at least one memory, the at least one processor configured to:
   identify an overlapping portion of a first image frame and a second image frame, and a non-overlapping portion of the first image frame;
   determine depth information for one or more pixels in the overlapping portion of the first image frame, wherein a stereo overlap technique is used to determine the depth information; and
   provide the depth information to a machine learning model to determine depth information for the non-overlapping portion of first image frame.

2. The system of claim 1, wherein the at least one processor is further configured to:
   determine semantic information for the non-overlapping portion of the first image frame; and
   determine depth information based on the semantic information for the portion of the first image frame that does not overlap the second image frame.

3. The system of claim 1, wherein the first image frame and the second image frame are collected by one or more camera sensors mounted to an autonomous vehicle.

4. The system of claim 1, wherein the depth information comprises a depth value for each pixel within the portion of the first image frame that overlaps the second image frame.

5. The system of claim 1, wherein the depth information for the first image frame includes a global metric scale for the first image frame.

6. The system of claim 2, wherein the semantic information for the portion of the first image frame that does not overlap the second image frame includes depth information obtained using a monocular depth technique.

7. The system of claim 1, wherein the first image frame and the second image frame are captured by a camera sensor of an autonomous vehicle.

8. A method comprising:
   identifying an overlapping portion of a first image frame and a second image frame, and a non-overlapping portion of the first image frame;
   determining depth information for one or more pixels in the overlapping portion of the first image frame, wherein a stereo overlap technique is used to determine the depth information; and
   providing the depth information to a machine learning model to determine depth information for the non-overlapping portion of first image frame.

9. The method of claim 8, further comprising:
   determining semantic information for the non-overlapping portion of the first image frame; and
   determining depth information based on the semantic information for the portion of the first image frame that does not overlap the second image frame.

10. The method of claim 8, wherein the first image frame and the second image frame are collected by one or more camera sensors mounted to an autonomous vehicle.

11. The method of claim 8, wherein the depth information comprises a depth value for each pixel within the portion of the first image frame that overlaps the second image frame.

12. The method of claim 8, wherein the depth information for the first image frame includes a global metric scale for the first image frame.

13. The method of claim 9, wherein the semantic information for the portion of the first image frame that does not overlap the second image frame includes depth information obtained using a monocular depth technique.

14. The method of claim 8, wherein the first image frame and the second image frame are captured by a camera sensor of an autonomous vehicle.

15. A non-transitory computer-readable storage medium comprising at least one instruction for causing a computer or processor to:
   identify an overlapping portion of a first image frame and a second image frame, and a non-overlapping portion of the first image frame;
   determine depth information for one or more pixels in the overlapping portion of the first image frame, wherein a stereo overlap technique is used to determine the depth information; and
   provide the depth information to a machine learning model to determine depth information for the non-overlapping portion of first image frame.

16. The non-transitory computer-readable storage medium of claim 15, wherein the at least one instruction causes the computer or processor to further:
   determine semantic information for the non-overlapping portion of the first image frame; and
   determine depth information based on the semantic information for the portion of the first image frame that does not overlap the second image frame.

17. The non-transitory computer-readable storage medium of claim 15, wherein the first image frame and the second image frame are collected by one or more camera sensors mounted to an autonomous vehicle.

18. The non-transitory computer-readable storage medium of claim 15, wherein the depth information comprises a depth value for each pixel within the portion of the first image frame that overlaps the second image frame.

19. The non-transitory computer-readable storage medium of claim 15, wherein the depth information for the first image frame includes a global metric scale for the first image frame.

20. The non-transitory computer-readable storage medium of claim 16, wherein the semantic information for the portion of the first image frame that does not overlap the second image frame includes depth information obtained using a monocular depth technique.

* * * * *